(12) United States Patent
Mitsui

(10) Patent No.: US 12,277,285 B2
(45) Date of Patent: Apr. 15, 2025

(54) CONDUCTIVE MEMBER FOR TOUCH PANEL, TOUCH PANEL, AND TOUCH PANEL DISPLAY DEVICE

(71) Applicant: FUJIFILM Corporation, Tokyo (JP)

(72) Inventor: Tetsuro Mitsui, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/363,459

(22) Filed: Aug. 1, 2023

(65) Prior Publication Data

US 2023/0376142 A1 Nov. 23, 2023

Related U.S. Application Data

(63) Continuation of application No. PCT/JP2022/002649, filed on Jan. 25, 2022.

(30) Foreign Application Priority Data

Feb. 26, 2021 (JP) ................................. 2021-029810

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0445* (2019.05)

(58) Field of Classification Search
CPC ... G06F 3/04154; G06F 3/0445; G06F 3/0412
See application file for complete search history.

(56) References Cited

U.S. PATENT DOCUMENTS

2011/0261010 A1   10/2011   Nishitani et al.
2014/0184950 A1*   7/2014   Chu ...................... G06F 3/0446
                                                                                 349/12

(Continued)

FOREIGN PATENT DOCUMENTS

JP      2011-227793 A    11/2011
JP      2020-061006 A     4/2020

(Continued)

OTHER PUBLICATIONS

International Search Report issued in PCT/JP2022/002649 on Apr. 5, 2022.

(Continued)

*Primary Examiner* — Kevin M Nguyen
(74) *Attorney, Agent, or Firm* — Edwards Neils LLC; Jean C. Edwards, Esq.

(57) ABSTRACT

Provided is a conductive member for a touch panel, a touch panel, and a touch panel display device capable of accommodating a first and a second lead wire in a narrow region. A conductive member for a touch panel includes a first conductive layer disposed on a transparent insulating substrate; an insulating layer disposed on the first conductive layer; and a second conductive layer disposed on the insulating layer. The first conductive layer has a plurality of first touch detection electrodes, and a plurality of first lead wires led from the plurality of first touch detection electrodes. The second conductive layer has a plurality of second touch detection electrodes, and a plurality of second lead wires led from the plurality of second touch detection electrodes. At least a part of the first lead wire and at least a part of the second lead wire overlap each other in plan view.

15 Claims, 3 Drawing Sheets

(56) References Cited

U.S. PATENT DOCUMENTS

| | | | |
|---|---|---|---|
| 2014/0226083 A1* | 8/2014 | Dunphy | G06F 1/1692 349/12 |
| 2016/0085346 A1 | 3/2016 | Tsukamoto et al. | |
| 2016/0147325 A1* | 5/2016 | Tai | G06F 3/04164 345/173 |

FOREIGN PATENT DOCUMENTS

| | | |
|---|---|---|
| JP | 2020-123110 A | 8/2020 |
| WO | 2014/171103 A1 | 10/2014 |

OTHER PUBLICATIONS

Written Opinion issued in PCT/JP2022/002649 on Apr. 5, 2022.
International Preliminary Report on Patentability completed by WIPO on Aug. 29, 2023 in connection with International Patent Application No. PCT/JP2022/002649.

* cited by examiner

CONDUCTIVE MEMBER FOR TOUCH PANEL, TOUCH PANEL, AND TOUCH PANEL DISPLAY DEVICE

CROSS-REFERENCE TO RELATED APPLICATIONS

This application is a Continuation of PCT International Application No. PCT/JP2022/002649 filed on Jan. 25, 2022, which was published under PCT Article 21(2) in Japanese, and which claims priority under 35 U.S.C. § 119 (a) to Japanese Patent Application No. 2021-029810 filed on Feb. 26, 2021. The above applications are hereby expressly incorporated by reference, in their entirety, into the present application.

BACKGROUND OF THE INVENTION

1. Field of the Invention

The present invention relates to a conductive member for a touch panel, to be used as an electrode for detecting a touch operation.

The present invention also relates to a touch panel including the conductive member for a touch panel.

The present invention further relates to a touch panel display device including the touch panel.

2. Description of the Related Art

Conventionally, in various electronic devices including portable information devices such as tablet computers and smartphones, touch panel display devices have been used in which an input operation to the electronic device can be performed by a so-called touch operation of bringing a finger, a stylus pen, or the like, into contact with or close to a screen.

Such a touch panel display device has a conductive member in which a touch detection electrode for detecting a touch operation is formed.

For example, JP2020-61006A discloses a conductive member consisting of a transparent insulating substrate, a first conductive layer disposed on the transparent insulating substrate, and a second conductive layer disposed on the first conductive layer. Each of the first conductive layer and the second conductive layer has a plurality of touch detection electrodes and lead wires led from the touch detection electrodes.

SUMMARY OF THE INVENTION

In a touch panel display device, there is an increasing demand for a so-called narrow bezel in which a frame portion that is not used for touch detection is narrowed. In order to narrow the bezel, for example, a region of a conductive member in which lead wires led from touch detection electrodes are disposed may be narrowed. However, in the conductive member disclosed in JP2020-61006A, since the lead wires are arranged in a plane, there is a problem in that a region in which the lead wires are arranged becomes wide.

The present invention is made to solve such a conventional problem, and an object of the present invention is to provide a conductive member for a touch panel in which lead wires can be accommodated in a sufficiently narrow region.

Another object of the present invention is to provide a touch panel including the conductive member for a touch panel.

Still another object of the present invention is to provide a touch panel display device including the touch panel.

A conductive member for a touch panel according to the present invention includes a transparent insulating substrate; a first conductive layer disposed on a surface of the transparent insulating substrate; a first insulating layer disposed on the first conductive layer; and a second conductive layer disposed on the first insulating layer. The transparent insulating substrate has a touch detection region and a lead wire region located on an outer side of the touch detection region in plan view. The first conductive layer has a plurality of first touch detection electrodes disposed in the touch detection region, and a plurality of first lead wires led from the plurality of first touch detection electrodes and disposed in the lead wire region. The second conductive layer has a plurality of second touch detection electrodes disposed in the touch detection region and intersecting the plurality of first touch detection electrodes in plan view, and a plurality of second lead wires led from the plurality of second touch detection electrodes and disposed in the lead wire region. At least a part of the first lead wire and at least a part of the second lead wire overlap each other in plan view.

The conductive member for a touch panel further preferably includes, in the lead wire region, a third conductive layer disposed on the first insulating layer; and a second insulating layer disposed on the third conductive layer. The first insulating layer, the third conductive layer, and the second insulating layer are preferably disposed in this order between the plurality of first lead wires and the plurality of second lead wires in a thickness direction of the transparent insulating substrate.

The third conductive layer is preferably connected to a ground potential.

The transparent insulating substrate preferably has flexibility.

The first lead wire and the second lead wire preferably have portions that extend in parallel to each other and in which 50% or more of a wire width of the first lead wire and 50% or more of a wire width of the second lead wire overlap each other in plan view.

The first conductive layer preferably has two layers overlapping each other in a thickness direction of the transparent insulating substrate.

Also, the second conductive layer preferably has two layers overlapping each other in a thickness direction of the transparent insulating substrate.

A touch panel according to the present invention includes the above-described conductive member for a touch panel; and a cover member disposed on the second conductive layer.

A touch panel display device according to the present invention includes the above-described touch panel; and a display module including a display surface, the display surface being joined onto a back surface of the transparent insulating substrate.

With the invention, a conductive member for a touch panel includes a transparent insulating substrate; a first conductive layer disposed on a surface of the transparent insulating substrate; a first insulating layer disposed on the first conductive layer; and a second conductive layer disposed on the first insulating layer. The transparent insulating substrate has a touch detection region and a lead wire region located on an outer side of the touch detection region in plan view. The first conductive layer has a plurality of first touch detection electrodes disposed in the touch detection region, and a plurality of first lead wires led from the plurality of first touch detection electrodes and disposed in the lead wire region. The second conductive layer has a plurality of second touch detection electrodes disposed in the touch detection region and intersecting the plurality of first touch detection electrodes in plan view, and a plurality of second lead wires led from the plurality of second touch detection electrodes and disposed in the lead wire region. At least a part of the first lead wire and at least a part of the second lead wire overlap each other in plan view. Accordingly, the first lead wire and the second lead wire can be accommodated in a sufficiently narrow region.

DESCRIPTION OF THE PREFERRED EMBODIMENTS

Hereinafter, a conductive member for a touch panel according to the present invention will be described in detail based on preferred embodiments illustrated in the accompanying drawings.

In the following description, the expression "to" indicating a numerical range includes numerical values written on both sides of "to". For example, "s is a numerical value t1 to a numerical value t2" means that the range of s is a range including the numerical value t1 and the numerical value t2, and is t1≤s≤t2 in mathematical symbols.

Angles including "orthogonal", "parallel", and the like, include error ranges generally accepted in the technical field unless otherwise specified.

"Transparent" means that the transmittance is at least 40% or more, preferably 75% or more, more preferably 80% or more, and further preferably 90% or more in the visible light wavelength range of wavelengths 400 nm to 800 nm. The transmittance is measured by using "Plastics-Determination of total luminous transmittance and reflectance" prescribed in JIS K 7375:2008.

Embodiment 1

Figure 1:
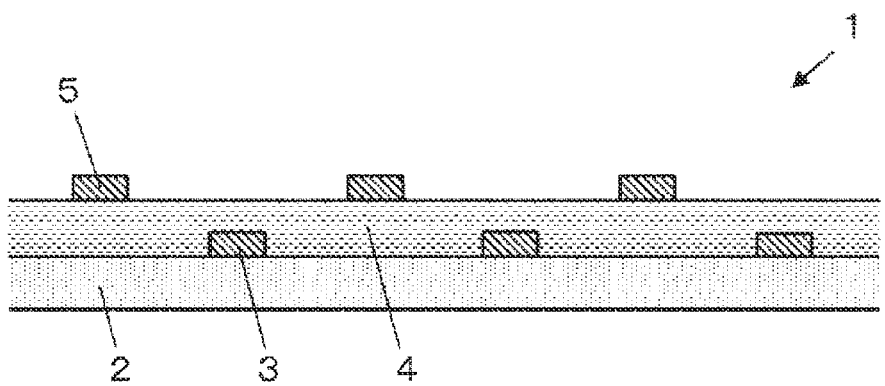
FIG. 1 is a partial cross-sectional view of a conductive member for a touch panel according to Embodiment 1.

FIG. 1 illustrates a configuration of a conductive member 1 for a touch panel according to Embodiment 1 of the present invention.

The conductive member 1 for a touch panel includes a transparent insulating substrate 2, a first conductive layer 3 disposed on a surface of the transparent insulating substrate 2, an insulating layer 4 disposed on the transparent insulating substrate 2 and on the first conductive layer 3, and a second conductive layer 5 disposed on the insulating layer 4.

A cover member (not illustrated) is disposed on a surface of the conductive member 1 for a touch panel on a second-conductive-layer-5 side, a display module (not illustrated) is disposed on a surface of the conductive member 1 for a touch panel on a transparent-insulating-substrate-2 side, and thus the conductive member 1 for a touch panel can be used as a touch panel display device (not illustrated). At this time, a user's finger, a stylus pen, or the like, in contact with or close to the cover member is detected, and hence a touch operation by the user is detected.

The first conductive layer 3 has a first touch detection electrode consisting of a mesh-shaped conductive material, and the second conductive layer 5 has a second touch detection electrode consisting of a mesh-shaped conductive material overlapping the first touch detection electrode in a thickness direction of the transparent insulating substrate 2. FIG. 1 is a partial cross-sectional view of the conductive member 1 for a touch panel in a region where the first touch detection electrode and the second touch detection electrode overlap each other.

Figure 2:
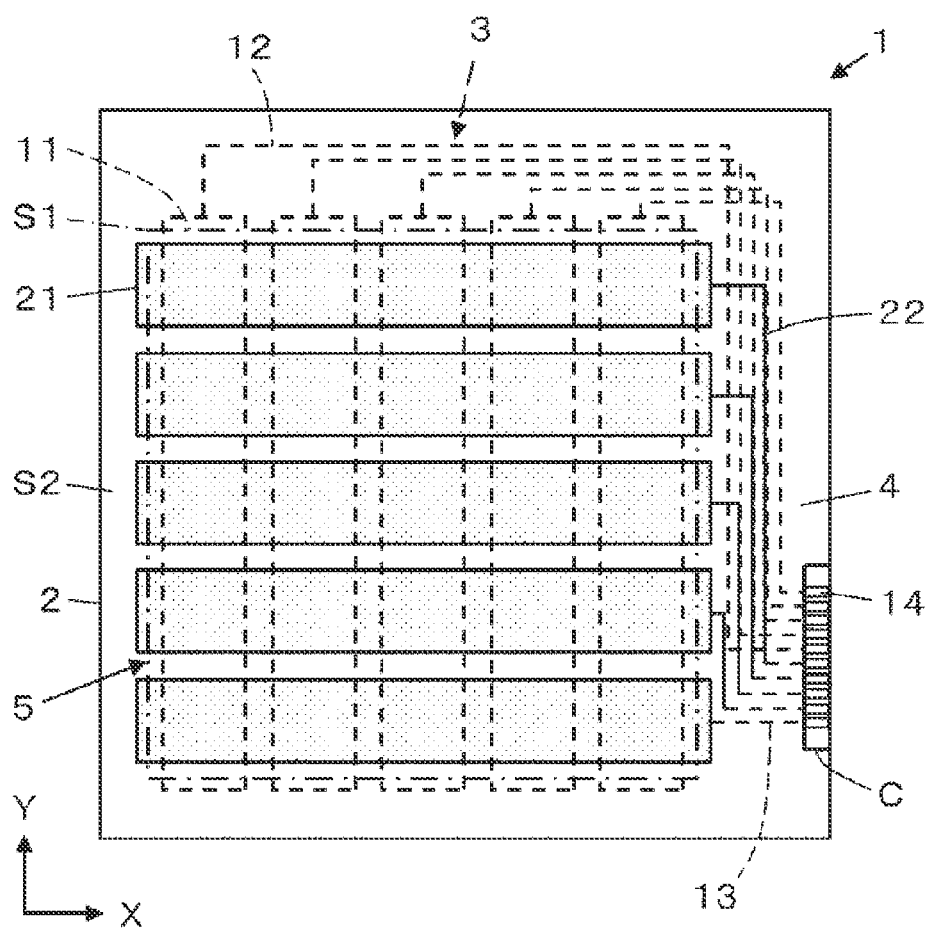
FIG. 2 is a plan view of the conductive member for a touch panel according to Embodiment 1.

FIG. 2 is a plan view illustrating a part of the conductive member 1 for a touch panel.

In plan view, the transparent insulating substrate 2 has a touch detection region S1 that is visually recognized by a user, for detecting a touch operation with a finger, a stylus pen, and the like, and a lead wire region S2 located on an outer side of the touch detection region S1.

The second conductive layer 5 disposed on the insulating layer 4 has a plurality of second touch detection electrodes 21 extending along a certain direction and arranged in a direction orthogonal to the certain direction, and a plurality of second lead wires 22 led from the plurality of respective second touch detection electrodes 21. The plurality of second touch detection electrodes 21 are located in the touch detection region S1, and the plurality of second lead wires 22 are located in the lead wire region S2.

Here, for convenience, a direction in which the second touch detection electrodes 21 extend is referred to as an X direction, an arrangement direction of the plurality of second touch detection electrodes 21 orthogonal to the X direction is referred to as a Y direction, and the transparent insulating substrate 2 is formed along an XY plane. Also, a direction perpendicular to the XY plane, that is, the thickness direction of the transparent insulating substrate 2 is referred to as a Z direction.

The first conductive layer 3 disposed on the transparent insulating substrate 2 has a plurality of first touch detection electrodes 11 extending along the Y direction and arranged in the X direction, a plurality of first lead wires 12 led from the plurality of respective first touch detection electrodes 11, a plurality of connection wires 13 connected to end portions of the plurality of second lead wires 22 of the second conductive layer 5 by so-called via holes or the like, and a plurality of electrode pads 14 connected to the plurality of respective first lead wires 12 and the plurality of respective connection wires 13.

The plurality of first touch detection electrodes 11 are located in the touch detection region S1, and the plurality of first lead wires 12, the plurality of connection wires 13, and the plurality of electrode pads 14 are located in the lead wire region S2.

Also, a cutout portion C is formed in the insulating layer 4 so as to surround the plurality of electrode pads 14, and the plurality of electrode pads 14 are exposed to the outside from the insulating layer 4. A plurality of wires (not illustrated) connected to an external circuit board (not illustrated) are connected to the plurality of electrode pads 14 exposed from the insulating layer 4 in this manner.

Each of the first lead wire 12 and the second lead wire 22 has a portion extending along the Y direction. A part of the portion of the first lead wire 12 extending along the Y direction and a part of the portion of the second lead wire 22 extending along the Y direction overlap each other in plan view.

Figure 3:
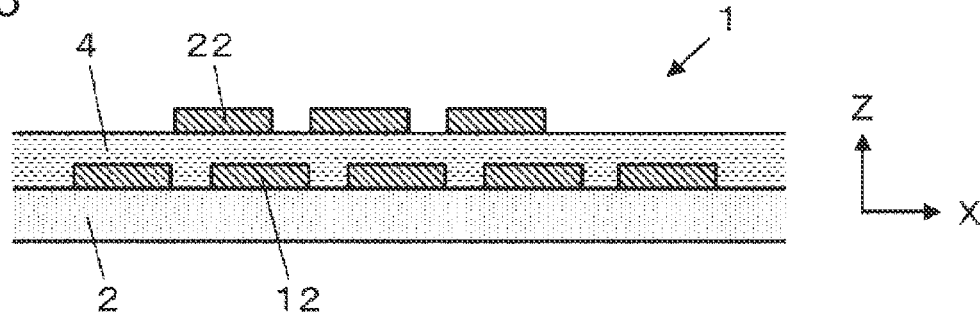
FIG. 3 is a partial cross-sectional view of the conductive member for a touch panel in a region including a first lead wire and a second lead wire according to Embodiment 1.

FIG. 3 is a partial cross-sectional view of the conductive member 1 for a touch panel in a region including the first lead wire 12 and the second lead wire 22. As illustrated in this drawing, the first lead wire 12 and the second lead wire 22 overlap each other in the Z direction via the insulating layer 4.

As described above, with the conductive member 1 for a touch panel according to Embodiment 1 of the present invention, the first lead wire 12 and the second lead wire 22 have the portions overlapping in the Z direction in a state of being electrically insulated from each other. Thus, when viewed in the Z direction, the first lead wire 12 and the second lead wire 22 can be accommodated in a sufficiently narrow region.

Figure 4:
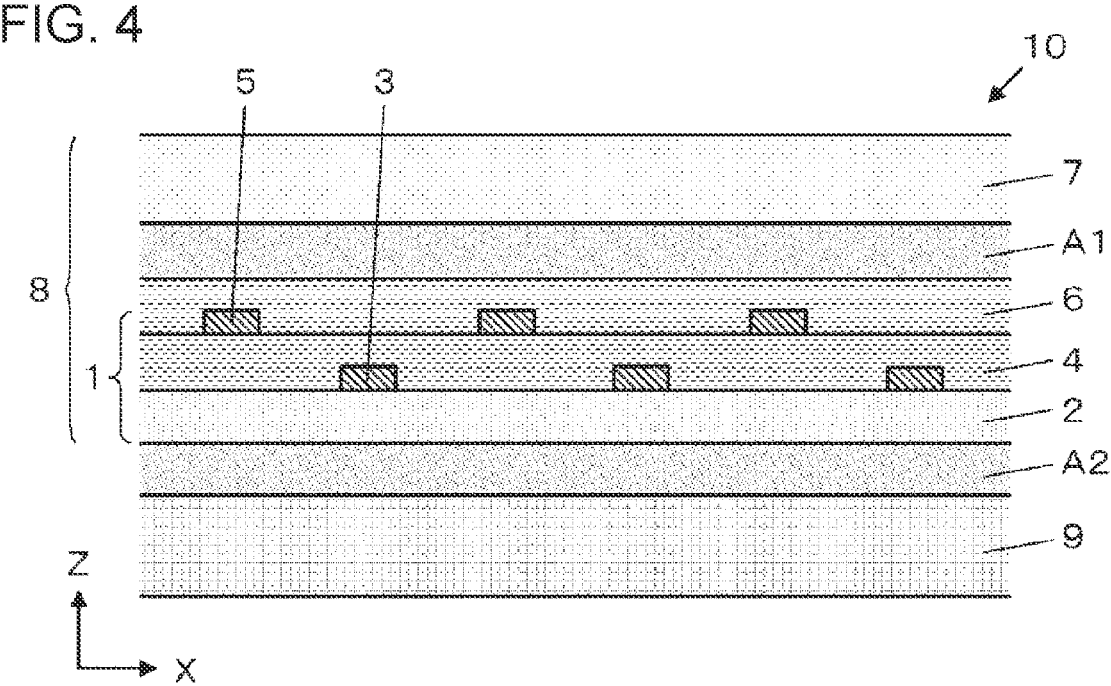
FIG. 4 is a partial cross-sectional view of a touch panel display device according to Embodiment 1.

Here, as illustrated in FIG. 4, a transparent cover member 7 is joined onto the second conductive layer 5 of the conductive member 1 for a touch panel of Embodiment 1 with a transparent pressure sensitive adhesive A1, and thus a touch panel 8 can be constituted. As illustrated in FIG. 4, an insulating layer 6 may be further disposed on the insulating layer 4 and on the second conductive layer 5 for the purpose of protecting the second conductive layer 5.

The cover member 7 protects the conductive member 1 for a touch panel and forms a touch surface on which a touch operation is performed with a user's finger, a stylus pen, and the like.

Although not illustrated, in such a touch panel 8, an opaque decorative layer is disposed in the lead wire region S2 located on the outer side of the touch detection region S1 to cover the plurality of first lead wires 12, the plurality of connection wires 13, the plurality of electrode pads 14, the plurality of second lead wires 22, various wires connected to the plurality of electrode pads 14, and the like. The portion in which the opaque decorative layer is disposed in this way is so-called a bezel, and in recent years, for various reasons such as downsizing of a touch panel, a so-called narrow bezel in which the bezel is narrowed is being demanded.

In the conductive member 1 for a touch panel according to Embodiment 1, as illustrated in FIG. 3, the first lead wire 12 and the second lead wire 22 have the portions overlapping each other in the Z direction, the first lead wire 12 and the second lead wire 22 can be accommodated in a sufficiently narrow region, and hence the bezel can be easily narrowed.

Also, a display module 9 for displaying an image is disposed on aback surface, that is, a surface on a −Z direction side of the transparent insulating substrate 2 with respect to the touch panel 8 via a transparent pressure sensitive adhesive A2, and thus a touch panel display device 10 can be constituted. Even in the touch panel display device 10, since the first lead wire 12 and the second lead wire 22 of the conductive member 1 for a touch panel have the portions overlapping each other in the Z direction, the bezel can be easily narrowed.

In the example illustrated in FIG. 2, five first touch detection electrodes 11 are arranged in the X direction, and five second touch detection electrodes 21 are arranged in the Y direction, but the number of first touch detection electrodes 11 and the number of second touch detection electrodes 21 are not particularly limited. For example, six or more first touch detection electrodes 11 may be arranged in the X direction, and six or more second touch detection electrodes 21 may be arranged in the Y direction.

From the viewpoint of accommodating the first lead wire 12 and the second lead wire 22 in a sufficiently narrow region, it is preferable that the portions of the first lead wire 12 and the second lead wire 22 extending parallel to each other, such as the portions extending in the Y direction in FIG. 2, overlap each other in the Z direction by 50% or more of the wire width of the first lead wire 12 and by 50% or more of the wire width of the second lead wire 22.

Here, the portions of the first lead wire 12 and the second lead wire 22 extending in parallel to each other include not only portions extending strictly in parallel to each other but also portions disposed adjacent to each other and extending while having an angular difference in a certain range. As the angular difference in the certain range, for example, an angular difference in a range of 0° to 5° is preferable, and an angular difference in a range of 0° to 2° is more preferable.

Also, in the present invention, the expression "the first lead wire 12 and the second lead wire 22 overlap each other in plan view" includes not only a case where at least a part of the first lead wire 12 and at least a part of the second lead wire 22 overlap each other in the Z direction, but also a case where the first lead wire 12 and the second lead wire 22 are close to each other in plan view, that is, in the XY plane. When the first lead wire 12 and the second lead wire 22 are close to each other in the XY plane, from the viewpoint of accommodating the first lead wire 12 and the second lead wire 22 in a sufficiently narrow region, the interval between the first lead wire 12 and the second lead wire 22 is preferably as narrow as possible, and is preferably 50 μm or less, more preferably 20 μm or less, and further preferably 10 μm or less.

Although it is described that each of the first touch detection electrode 11 and the second touch detection electrode 21 consists of a mesh-shaped conductive material, the shape and the material thereof are not particularly limited as long as the first touch detection electrode 11 and the second touch detection electrode 21 can be used as detection electrodes for a touch panel. For example, the first touch detection electrode 11 and the second touch detection electrode 21 may be formed of a plate-shaped transparent conductive oxide such as indium tin oxide (ITO).

The thicknesses of the first touch detection electrode 11, the first lead wire 12, the connection wire 13, and the electrode pad 14 of the first conductive layer 3 and the thicknesses of the second touch detection electrode 21 and the second lead wire 22 of the second conductive layer 5 are preferably 0.01 μm to 10.00 μm, more preferably 0.05 μm to 3.00 μm, and further preferably 0.10 μm to 1.00 μm from the viewpoint of preventing a failure such as disconnection when the conductive member 1 for a touch panel is bent and from the viewpoint of obtaining sufficient conductivity.

Also, the thickness of the insulating layer 4 is preferably 0.01 μm to 10.00 μm, more preferably 0.05 μm to 3.00 μm, and further preferably 0.10 μm to 1.00 μm, from the viewpoint of preventing a failure such as cracking when the conductive member 1 for a touch panel is bent, and from the viewpoint of obtaining sufficient electrical insulating properties.

Further, the transparent insulating substrate 2 preferably has flexibility from the viewpoint of preventing a failure such as cracking when the conductive member 1 for a touch panel is bent.

Embodiment 2

In the case where the first lead wire 12 and the second lead wire 22 overlap each other in the Z direction via the insulating layer 4 as illustrated in FIG. 3, electromagnetic interference between the first lead wire 12 and the second lead wire 22 is likely to occur, and an electromagnetic wave may be transmitted as noise from one of the first lead wire 12 and the second lead wire 22 to the other. Thus, a conductive layer for shielding an electromagnetic wave may be disposed between the first lead wire 12 and the second lead wire 22.

Figure 5:
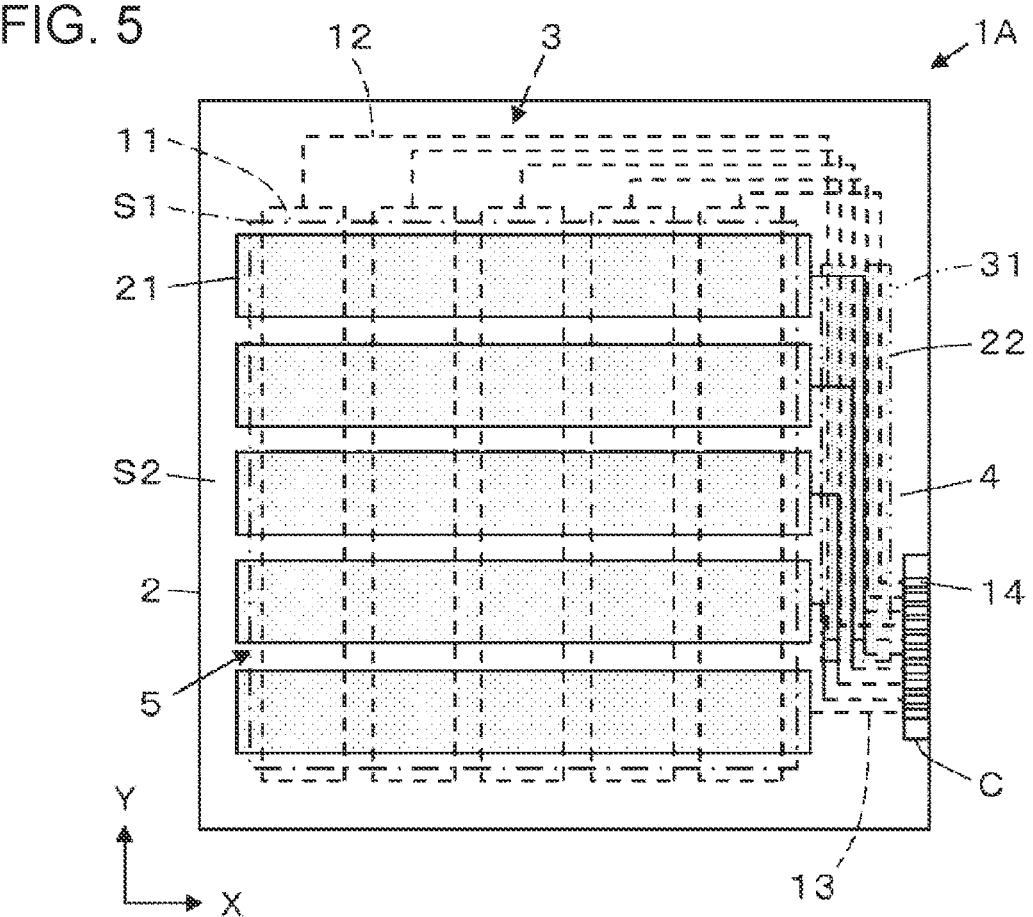
FIG. 5 is a plan view of a conductive member for a touch panel according to Embodiment 2.

FIG. 5 is a plan view of a conductive member 1A for a touch panel according to Embodiment 2. The conductive member 1A for a touch panel is obtained by disposing a third conductive layer 31 in a region where the first lead wire 12 and the second lead wire 22 extend in parallel to each other along the Y direction and overlap each other in plan view in the conductive member 1 for a touch panel illustrated in FIG. 1.

Figure 6:
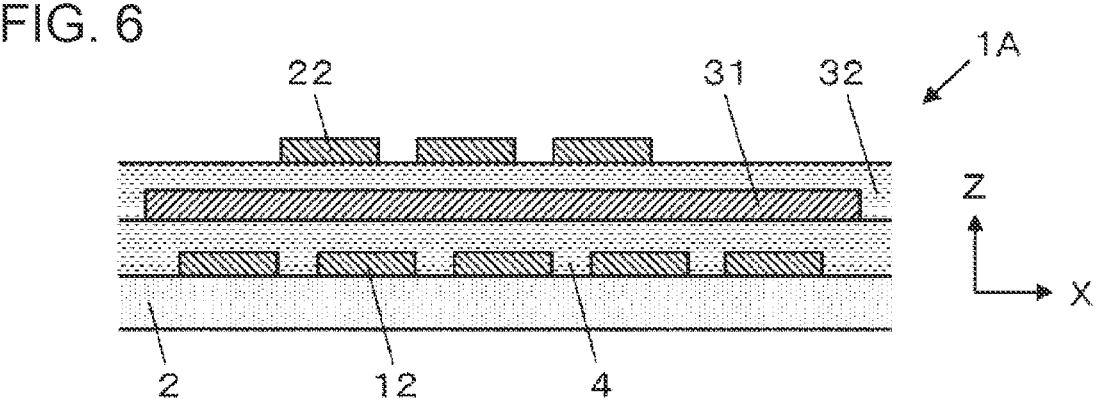
FIG. 6 is a partial cross-sectional view of the conductive member for a touch panel in a region including a first lead wire and a second lead wire according to Embodiment 2.

As illustrated in FIG. 6, the third conductive layer 31 is disposed on the insulating layer 4 disposed on the transparent insulating substrate 2 and the first lead wire 12. Also, an insulating layer 32 is disposed on the insulating layer 4 and the third conductive layer 31, and the second lead wire 22 is disposed on the insulating layer 32. Thus, the first lead wire 12 and the third conductive layer 31 are electrically insulated from each other, and the second lead wire 22 and the third conductive layer 31 are electrically insulated from each other.

The third conductive layer 31 is located between the first lead wire 12 and the second lead wire 22. Thus, an electromagnetic wave emitted from one of the first lead wire 12 and the second lead wire 22 is shielded by the third conductive layer 31. Thus, an electromagnetic wave is prevented from being transmitted as noise from one of the first lead wire 12 and the second lead wire 22 to the other.

The shape of the third conductive layer 31 is not particularly limited as long as the electromagnetic wave emitted from at least one of the first lead wire 12 or the second lead wire 22 can be shielded. The third conductive layer 31 may have, for example, a mesh shape or a plate shape.

Also, the third conductive layer 31 may be disposed at least in a region where the first lead wire 12 and the second lead wire 22 overlap each other in plan view, and for example, may be disposed over the entire lead wire region S2.

Also, the conductive member 1A for a touch panel is provided with the electrode pad 14 for connection to external wiring (not illustrated) having a so-called ground potential and wiring (not illustrated) for electrically connecting the electrode pad 14 and the third conductive layer 31 to each other, and thus the third conductive layer 31 can be connected to a ground potential. Accordingly, the third conductive layer 31 can more reliably shield an electromagnetic wave emitted from one of the first lead wire 12 and the second lead wire 22.

Other than the third conductive layer 31, for example, a shield layer disposed in the same layer as the first lead wire 12 and overlapping the second lead wire 22 in plan view, a shield layer disposed in the same layer as the second lead wire 22 and overlapping the first lead wire 12 in plan view, a shield layer disposed so as to cover the second lead wire 22, and the like, as described in JP2020-61006A and WO2016/136965A, may be formed.

Embodiment 3

In Embodiment 1 and Embodiment 2, the first lead wire 12 and the second lead wire 22 overlap each other in plan view. However, each of the first conductive layer 3 constituting the plurality of first lead wires 12 and the second conductive layer 5 constituting the plurality of second lead wires 22 may consist of two layers overlapping each other in the Z direction.

Figure 7:
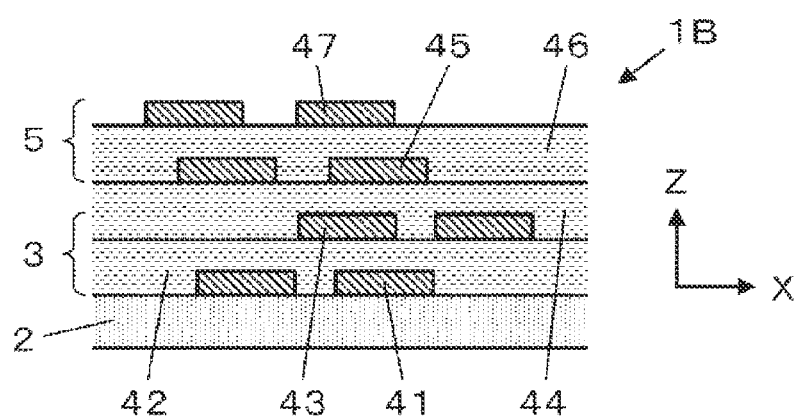
FIG. 7 is a partial cross-sectional view of a conductive member for a touch panel in a region including a first lead wire and a second lead wire according to Embodiment 3.

FIG. 7 is a partially cross-sectional view of a conductive member 1B for a touch panel according to Embodiment 3. In the conductive member 1B for a touch panel, a first lead wire 41 is disposed on a transparent insulating substrate 2, an insulating layer 42 is disposed on the transparent insulating substrate 2 and on the first lead wire 41, a first lead wire 43 is disposed on the insulating layer 42, an insulating layer 44 is disposed on the insulating layer 42 and on the first lead wire 43, a second lead wire 45 is disposed on the insulating layer 44, an insulating layer 46 is disposed on the insulating layer 44 and on the second lead wire 45, and a second lead wire 47 is disposed on the insulating layer 46.

As described above, the first conductive layer 3 constituting the plurality of first lead wires 41 and 43 is composed of a layer including the first lead wire 41 disposed on the transparent insulating substrate 2 and a layer including the first lead wire 43 disposed on the insulating layer 42. Also, the second conductive layer 5 constituting the plurality of second lead wires 45 and 47 is composed of a layer including the second lead wire 45 disposed on the insulating layer 44 and a layer including the second lead wire 47 disposed on the insulating layer 46.

Although not illustrated, one end portions of the plurality of first lead wires 41 and 43 are connected to the plurality of first touch detection electrodes 11 disposed in the same layer of the first conductive layer 3 through via holes or the like, and the other end portions are connected to the plurality of electrode pads 14 disposed in the same layer of the first conductive layer 3 through via holes or the like.

Also, one end portions of the plurality of second lead wires 45 and 47 are connected to the plurality of second touch detection electrodes 21 disposed in the same layer of the second conductive layer 5 through via holes or the like, and the other end portions are connected to the other end portions of the plurality of connection wires 13 disposed in the same layer or the two layers of the first conductive layer 3 and having one end portions connected to the plurality of electrode pads 14 of the first conductive layer 3 through via holes or the like.

As described above, with the conductive member 1B for a touch panel of Embodiment 3, the first conductive layer 3 constituting the plurality of first lead wires 41 and 43 and the second conductive layer 5 constituting the plurality of second lead wires 45 and 47 are each composed of two layers overlapping each other in the Z direction. Thus, the plurality of first lead wires 41 and 43 and the plurality of second lead wires 45 and 47 can be accommodated in a narrower region.

Although it is described that each of the first conductive layer 3 constituting the plurality of first lead wires 41 and 43 and the second conductive layer 5 constituting the plurality of second lead wires 45 and 47 consists of two layers, only one of them may consist of two layers. Even in this case, the plurality of first lead wires 41 and 43 and the plurality of second lead wires 45 and 47 can be accommodated in a sufficiently narrow region.

Embodiment 4

In the conductive member 1B for a touch panel according to Embodiment 3, a third conductive layer can be disposed between the plurality of first lead wires 41 and 43 and the plurality of second lead wires 45 and 47 as in the conductive member 1A for a touch panel according to Embodiment 2.

Figure 8:
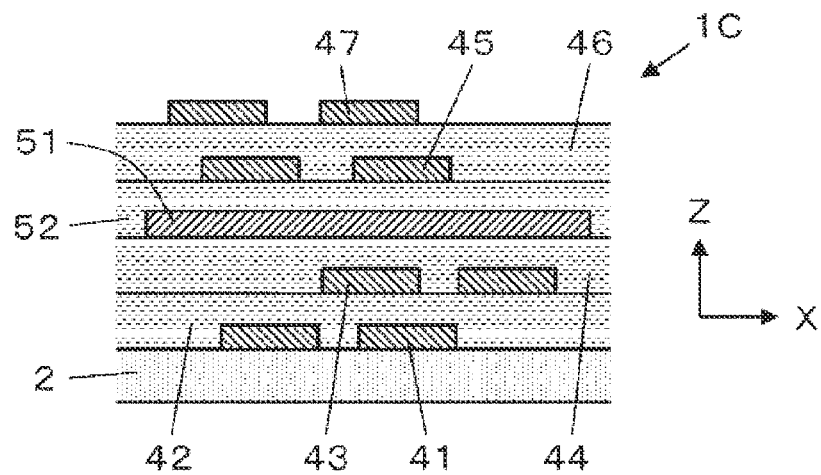
FIG. 8 is a partial cross-sectional view of a conductive member for a touch panel in a region including a first lead wire and a second lead wire according to Embodiment 4.

FIG. 8 is a partially cross-sectional view of a conductive member 1C for a touch panel according to Embodiment 4. The conductive member 1C for a touch panel is obtained by disposing a third conductive layer 51 and an insulating layer 52 between the insulating layer 44, and the second lead wire 45 and the insulating layer 46 in the conductive member 1B for a touch panel according to Embodiment 3 illustrated in FIG. 7. The third conductive layer 51 is the same as the third conductive layer 31 in Embodiment 2 illustrated in FIGS. 5 and 6, and is disposed on the insulating layer 44. The insulating layer 52 is disposed on the insulating layer 44 and on the third conductive layer 51.

In this way, since the third conductive layer 51 is disposed between the first lead wire 43 and the second lead wire 45, an electromagnetic wave emitted from one of the plurality of first lead wires 41 and 43 and the plurality of second lead wires 45 and 47 is shielded by the third conductive layer 51, and a high-frequency electromagnetic wave is prevented from being transmitted as noise from one of the first lead wires 41 and 43 and the second lead wires 45 and 47 to the other.

The third conductive layer 51 can be connected to the ground potential in the same manner as the third conductive layer 31 in Embodiment 2. In this case, the third conductive layer 51 can more reliably shield a high-frequency electromagnetic wave emitted from one of the first lead wires 41 and 43 and the second lead wires 45 and 47.

Hereinafter, respective members constituting the conductive member 1 for a touch panel according to Embodiment 1 will be described. Respective members constituting the conductive members 1A to 1C for a touch panel according to Embodiments 2 to 4 are similar to the respective members constituting the conductive member 1 for a touch panel according to Embodiment 1.

Transparent Insulating Substrate

The transparent insulating substrate 2 is not particularly limited as long as it is transparent and has electrical insulating properties, and for example, a resin substrate or the like is used. More specifically, as the material constituting the transparent insulating substrate 2, for example, polyethylene terephthalate (PET), polyethylene naphthalate (PEN), cyclo-olefine polymer (COP), cyclic olefin copolymer (COC), polycarbonate (PC), acrylic resin, polyethylene (PE), polypropylene (PP), polystyrene (PS), polyvinyl chloride (PVC), polyvinylidene chloride (PVDC), cellulose triacetate (TAC), or the like, can be used. The thickness of the transparent insulating substrate 2 is, for example, preferably 20 μm to 1100 μm, and more preferably 20 μm to 500 μm. In particular, in the case of an organic resin substrate such as PET, the thickness is preferably 20 μm to 200 μm, and more preferably 30 μm to 100 μm.

The total luminous transmittance of the transparent insulating substrate 2 is preferably 40% to 100%. The total luminous transmittance is measured by using, for example, "Plastics-Determination of total luminous transmittance and reflectance" prescribed in JIS K 7375:2008.

One preferred embodiment of the transparent insulating substrate 2 is a treated substrate that has been subjected to at least one treatment selected from the group consisting of atmospheric pressure plasma treatment, corona discharge treatment, and ultraviolet irradiation treatment. By performing the above-described treatment, a hydrophilic group such as an OH group is introduced into a surface of the treated transparent insulating substrate 2, and adhesiveness between the transparent insulating substrate 2 and the first conductive layer 3 is improved. Also, among the above-described treatment, the atmospheric pressure plasma treatment is preferable in that the adhesiveness between the transparent insulating substrate 2 and the first conductive layer 3 is further improved.

First Conductive Layer and Second Conductive Layer

The first conductive layer 3 and the second conductive layer 5 are formed of a metal or an alloy, and can be formed of, for example, silver, copper, gold, aluminum, nickel, chromium, molybdenum, or tungsten. The first conductive layer 3 and the second conductive layer 5 preferably include copper, but may include a metal other than copper, such as gold or silver. Also, the first conductive layer 3 and the second conductive layer 5 may contain metal silver and gelatin or a polymer binder, such as acrylic latex or styrene latex, which are suitable for forming a mesh pattern. Other preferred examples are metals, such as aluminum, silver, molybdenum, and titanium, and an alloy thereof. Further, a laminated structure of the above-described materials may be used. For example, a thin metal wire having a laminated structure of molybdenum/copper/molybdenum, molybdenum/aluminum/molybdenum, or the like, can be used.

Further, the first conductive layer 3 and the second conductive layer 5 may include, for example, metal-oxide particles; a metal paste, such as a silver paste or a copper paste; or metal nanowire particles, such as silver nanowires or copper nanowires.

Next, a method of forming the first conductive layer 3 and the second conductive layer 5 will be described. As a method of forming these, for example, a sputtering process, a plating process, a silver halide process, a printing process, or the like, can be appropriately used.

A method of forming the first conductive layer 3 and the second conductive layer 5 by the sputtering process will be described. The first conductive layer 3 and the second conductive layer 5 can be formed by first forming a copper foil layer by sputtering, and forming copper wires from the copper foil layer by a photolithography process. The copper foil layer may be formed by so-called vapor deposition instead of sputtering. As the copper foil layer, an electrolytic copper foil can be used other than a sputtered copper foil or a vapor-deposited copper foil. More specifically, a process of forming copper wires described in JP2014-29614A can be used.

A method of forming the first conductive layer 3 and the second conductive layer 5 by the plating process will be described. For example, the first conductive layer 3 and the second conductive layer 5 can be constituted using a metal plating film that is formed on an electroless plating underlayer by performing electroless plating on the underlayer. In this case, the first conductive layer 3 and the second conductive layer 5 are formed by forming a catalytic ink containing at least metal fine particles in a pattern on a substrate, and then immersing the substrate in an electroless plating bath to form a metal plating film. More specifically, a method of producing a metal coated substrate described in JP2014-159620A can be used.

The first conductive layer 3 and the second conductive layer 5 are formed by forming a resin composition having at least a functional group capable of interacting with a metal catalytic precursor in a pattern on a substrate, then applying a catalyst or a catalytic precursor, and immersing the substrate in an electroless plating bath to form a metal plating film. More specifically, a method of producing a metal coated substrate described in JP2012-144761A can be applied.

A method of forming the first conductive layer 3 and the second conductive layer 5 by the silver halide process will be described. The first conductive layer 3 and the second conductive layer 5 can be formed by first performing exposure processing of exposing a silver halide emulsion layer including silver halide to light using exposure patterns for forming the first conductive layer 3 and the second conductive layer 5, and then performing development processing on the exposed silver halide emulsion layer. More specifically, methods of producing thin metal wires described in JP2012-6377A, JP2014-112512A, JP2014-209332A, JP2015-22397A, JP2016-192200A, and WO2016/157585A can be used.

A method of forming the first conductive layer 3 and the second conductive layer 5 by the printing process will be described. The first conductive layer 3 and the second conductive layer 5 can be formed by first applying a conductive paste containing a conductive powder to a substrate so as to have the same patterns as the first conductive layer 3 and the second conductive layer 5, and then performing heat processing. The pattern formation using the conductive paste is performed by, for example, an inkjet process or a screen printing process. More specifically, a conductive paste described in JP2011-28985A can be used as the conductive paste.

Note that the third conductive layer 31 in Embodiment 2 and the third conductive layer 51 in Embodiment 4 are similar to the first conductive layer 3 and the second conductive layer 5 in Embodiment 1.

Cover Member

As the material of the cover member 7, tempered glass, polycarbonate, polyethylene terephthalate, polymethyl methacrylate (PMMA), or the like, can be used. The thickness of the cover member 7 is preferably 0.1 mm to 1.5 mm.

Pressure Sensitive Adhesive

As the pressure sensitive adhesive A1 for bonding the conductive member 1 for a touch panel and the cover member 7 to each other and the pressure sensitive adhesive A2 for bonding the conductive member 1 for a touch panel and the display module 9 to each other, an optical clear adhesive (OCA) sheet or optical clear resin (OCR) can be used. Preferable film thicknesses of the pressure sensitive adhesive A1 and the pressure sensitive adhesive A2 are 10 μm or more and 200 μm or less. As the optical clear adhesive sheet, for example, 8146 series manufactured by 3M Company can be used.

REFERENCE SIGNS LIST

1, 1A, 1B, 1C conductive member for touch panel
2 transparent insulating substrate
3 first conductive layer
4, 6, 32, 42, 44, 46, 52 insulating layer
5 second conductive layer
7 cover member
8 touch panel
9 display module
10 touch panel display device
11 first touch detection electrode
12, 41, 43 first lead wire
13 connection wire
14 electrode pad
21 second touch detection electrode
22, 45, 47 second lead wire
31, 51 third conductive layer
C cutout portion
S1 touch detection region
S2 lead wire region

What is claimed is:

1. A conductive member for a touch panel, comprising:
a transparent insulating substrate;
a first conductive layer disposed on a surface of the transparent insulating substrate;
a first insulating layer disposed on the first conductive layer; and
a second conductive layer disposed on the first insulating layer,
wherein the transparent insulating substrate has a touch detection region and a lead wire region located on an outer side of the touch detection region in plan view,
wherein the conductive member for a touch panel further comprises, in the lead wire region,
a third conductive layer disposed on the first insulating layer; and
a second insulating layer disposed on the third conductive layer,
wherein the first conductive layer has
a plurality of first touch detection electrodes disposed in the touch detection region, and
a plurality of first lead wires led from the plurality of first touch detection electrodes and disposed in the lead wire region,
wherein the second conductive layer has
a plurality of second touch detection electrodes disposed in the touch detection region and intersecting the plurality of first touch detection electrodes in plan view, and
a plurality of second lead wires led from the plurality of second touch detection electrodes and disposed in the lead wire region, and
wherein the plurality of first lead wires and the plurality of second lead wires partially overlap each other in plan view, and
wherein the first insulating layer, the third conductive layer, and the second insulating layer are disposed in this order between the plurality of first lead wires and the plurality of second lead wires in a thickness direction of the transparent insulating substrate.

2. The conductive member for a touch panel according to claim 1,
wherein the third conductive layer is connected to a ground potential.

3. The conductive member for a touch panel according to claim 2,
wherein the transparent insulating substrate has flexibility.

4. The conductive member for a touch panel according to claim 2,
wherein the plurality of first lead wires and the plurality of second lead wires have portions that extend in parallel to each other and in which 50% or more of a wire width of the plurality of first lead wires and 50% or more of a wire width of the plurality of second lead wires overlap each other in plan view.

5. The conductive member for a touch panel according to claim 2, wherein the first conductive layer has two layers overlapping each other in a thickness direction of the transparent insulating substrate.

6. The conductive member for a touch panel according to claim 2,
wherein the second conductive layer has two layers overlapping each other in a thickness direction of the transparent insulating substrate.

7. The conductive member for a touch panel according to claim 1,
wherein the transparent insulating substrate has flexibility.

8. The conductive member for a touch panel according to claim 7,
wherein the plurality of first lead wires and the plurality of second lead wires have portions that extend in parallel to each other and in which 50% or more of a wire width of the plurality of first lead wires and 50% or more of a wire width of the plurality of second lead wires overlap each other in plan view.

9. The conductive member for a touch panel according to claim 7,
wherein the first conductive layer has two layers overlapping each other in a thickness direction of the transparent insulating substrate.

10. The conductive member for a touch panel according to claim 7,
wherein the second conductive layer has two layers overlapping each other in a thickness direction of the transparent insulating substrate.

11. The conductive member for a touch panel according to claim 1,
wherein the plurality of first lead wires and the plurality of second lead wires have portions that extend in parallel to each other and in which 50% or more of a wire width of the plurality of first lead wires and 50% or more of a wire width of the plurality of second lead wires overlap each other in plan view.

12. The conductive member for a touch panel according to claim 1,
wherein the first conductive layer has two layers overlapping each other in a thickness direction of the transparent insulating substrate.

13. The conductive member for a touch panel according to claim 1,
wherein the second conductive layer has two layers overlapping each other in a thickness direction of the transparent insulating substrate.

14. A touch panel comprising:
the conductive member for a touch panel according to claim 1; and
a cover member disposed on the second conductive layer.

15. A touch panel display device comprising:
the touch panel according to claim 14; and
a display module comprising a display surface, the display surface being joined onto a back surface of the transparent insulating substrate.

* * * * *